United States Patent Office 3,416,913
Patented Dec. 17, 1968

3,416,913
BARBAN FOR WILD OAT CONTROL

Harry C. Zeisig, Jr. and Otto L. Hoffmann, Shawnee, Kans., assignors to Gulf Oil Corporation, Pittsburgh, Pa., a corporation of Pennsylvania
No Drawing. Filed July 30, 1965, Ser. No. 476,198
17 Claims. (Cl. 71—88)

ABSTRACT OF THE DISCLOSURE

The selective herbicidal action of 4-chlorobutynyl N-(3-chlorophenyl)carbamate (barban) in control of wild oats is enhanced by combination with at least one molar equivalent of a quaternary ammonium compound selected from a limited class having molecular weights between 200 and 400 and certain specific substituents, with the result that injury to wheat is minimized.

---

U.S. Patent 2,906,614 discloses halobutynyl N-halophenyl carbamates and use of these substances to control weeds, particularly wild oats. It has now been discovered that when these halobutynyl N-halophenyl carbamates are combined with quaternary ammonium salts, the resulting combinations exhibit unique characteristics, ranging from an almost complete lack of phytotoxicity to extreme, almost non-selective phytotoxicity.

The behavior of the quaternary ammonium compounds in these combinations is characteristic of reagents rather than synergists. For example, release of heat is observed on combining the two substances; the unique characteristics exhibited by the combination do not reach a maximum until at least one molar equivalent of quaternary is added, and in certain instances an equimolar adduct is easily recovered in the form of a crystalline solid. Furthermore, some quaternary ammonium compounds appear to nullify the phytotoxic characteristics of halobutynyl N-halophenyl carbamates, which is the direct opposite of a synergistic effect.

Briefly, the improved herbicidal compositions of this invention employ a herbicidally effective amount of a combination of a compound of the structure $$X-CH_2-C \equiv C-CH_2-O-\overset{O}{\underset{\|}{C}}-NH-\underset{\phantom{X}}{\underset{\phantom{X}}{\bigcirc}}-X$$

in which X is halo with at least one molar equivalent of a quaternary ammonium salt in which the cation has a molecular weight within the range of about 200 to 400 and a structure selected from the group consisting of

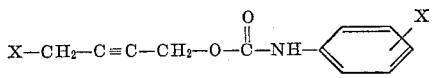

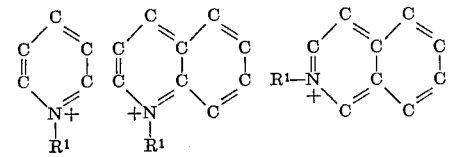

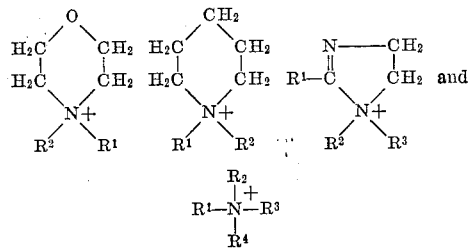

in which $R^1$ is a substituent containing from about 7 to about 21 carbon atoms selected from the group consisting of linear aliphatic, alkyl, alkenyl, alkynyl, halobenzyl and alkyl-benzyl; $R^2$ is a substituent selected from the group consisting of benzyl, methyl and alkyl, alkenyl, alkynyl and hydroxyalkyl containing no more than 7 carbon atoms; and $R^3$ and $R^4$ are selected from the group consisting of methyl, ethyl and hydroxyethyl.

These improved compositions possess to varying degrees a number of advantages, including increased effectiveness in control of wild oats with reduced danger of injury to wheat and ease of formulation, particularly as stable solutions for spray application.

Below are listed structural formulas of quaternary ammonium salts which have yielded combinations with halobutynyl N-halophenylcarbamates having particularly outstanding properties as herbicides.

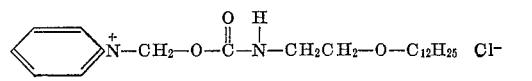

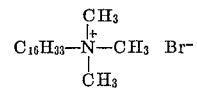

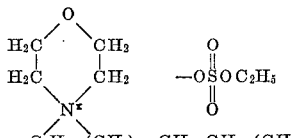

$C_2H_5\ (CH_2)_5-CH=CH-(CH_2)-CH=CH-(CH_2)_7-CH_3$

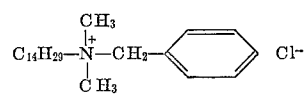

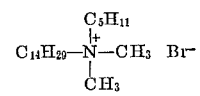

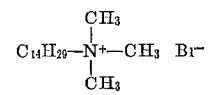

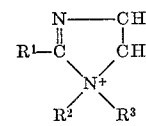

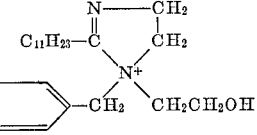

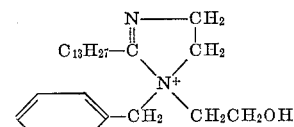

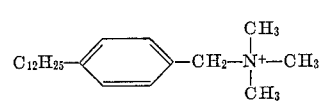

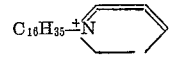

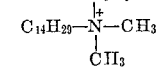

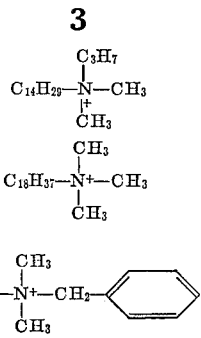

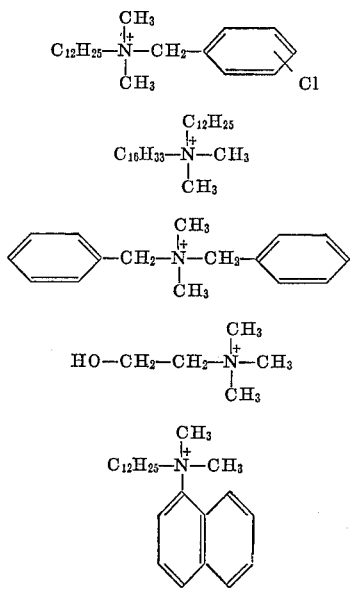

On the other hand, some quaternary ammonium salts, when combined with halobutynyl N-halophenylcarbamates yield inferior herbicidal compositions. Several of these compounds are exemplified by structural formula below:

Quaternary ammonium salts having cations of the structural type

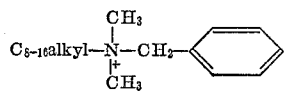

have been found to form equimolar adducts with 4-chlorobutynyl N-(3-chlorophenyl)carbamate. These adducts are dissociated almost completely at very low concentrations in solvents such as acetone and ethanol but are dissociated only slightly at high concentrations. These adducts may be recovered as crystalline solids by precipitation from concentrated solutions on cooling. The adducts are more effective as herbicides than the original 4-chlorobutynyl N-(3-chlorophenyl)carbamate and in general offer a better margin of safety with respect to injury of wheat. Preparation of a typical adduct is illustrated in the following example.

EXAMPLE I

Commercial barban herbicide conesisting of approximately 97 percent 4-chlorobutynyl N-(3-chlorophenyl)carbamate was reacted in alcohol solution with an equimolar quantity of alkyl dimethyl benzyl ammonium chloride in which the alkyl groups were approximately 40 percent dodecyl, 50 percent tetradecyl and 10 percent hexadecyl. Alcohol was removed by boiling, and the solution was cooled, yielding a solid crystalline precipitate which was recovered by filtration and dried. The dry solid melted at about 71–73° C. Repeated recrystallization from a mixture of benzene and hexane yielded a purified product melting at 73.0 to 74.5° C. Both the crude and the purified product were found to possess about twice the effectiveness of barban against wild oats. The increased effectiveness of the equimolar adduct makes it possible to reduce the dosage in controlling wild oats with substantial elimination of danger of injury to the wheat crop.

EXAMPLE II

A water dispersible concentrate was prepared containing 4-chloro-2-butynyl N-(3-chlorophenyl)carbamate (barban) and approximately 1.5 moles of a commercial quaternary ammonium salt having the structural formula:

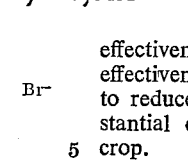

The proportions of ingredients used are listed below:

1.00 lb. of barban
4.00 lb. of 60 percent solution of 2-alkyl-1-benzyl-1-(2-hydroxyethyl)-2-imidazolinum chloride (Nalquat G-8-11)
0.14 lb. of stabilizer (Onamine RO)
0.86 lb. of nonionic emulsifier (Neutronyx 605)
Sufficient ethanol to make a total volume of one gallon.

The dispersible concentrate was diluted with water to make 60 gallons of spray mixture which was tested in the field to determine both the minimum application rate necessary to control weeds and the minimum rate which injures wheat.

Test results indicated that control of wild oats was obtained with the above formulation at an application rate of between 1.5 and 2 ounces of barban per acre, whereas more than 3 ounces of barban per acre could be applied by means of this formulation before any significant injury to wheat occurred. Conventional formulations of barban require 4 ounces of barban per acre to control wild oats but occasionally cause significant (5 percent) injury to wheat at application rates in excess of 4 ounces per acre.

EXAMPLE III

A water dispersible concentrate was prepared containing barban and approximately 1.75 moles of a commercial alkylbenzyl trimethylammonium chloride having the structural formula:

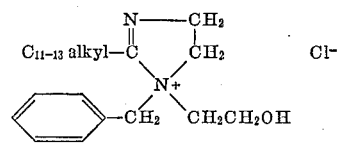

The alkylbenzyl group in this compound is derived from commercial dodecylbenzene, commonly called "detergent alkylate" containing either branched or straight chain alkyl groups. The proportions of ingredients used in the formulation are as follows:

1.00 lb. of barban
2.98 lb. of 80 percent active dodecylbenzyl trimethyl ammonium chloride
0.14 lb. of stabilizer (Onamine RO)
0.86 lb. of nonionic emulsifier (Neutronyx 605)
Sufficient ethanol to make a total volume of 1 gallon.

The dispersible concentrate was diluted with water to make 60 gallons of spray mixture as in Example II and was tested for effectiveness in controlling wild oats, as well as for injury to wheat. This formulation was found to control wild oats at a rate of application of only 1.5 ounces of barban per acre, whereas significant injury to wheat did not occur at application rates below 4 ounces of barban per acre.

The water dispersible concentrates exemplified in Examples 2 and 3 contain proportions of quaternary ammonium salts arrived at by compromise so as to obtain maximum effectiveness against wild oats without injury to wheat. Use of a greater proportion of quaternary ammonium salt was found to increase phytotoxicity but with a corresponding increase in the tendency to injure wheat. At proportions below one molar equivalent, an increase in phytotoxicity of barban was evident, but without significant improvement in selectivity.

The inclusion of nonionic emulsifier, stabilizer and ethanol in the formulations assures that the dispersible concentrate will remain stable in storage, even in freezing weather. Dispersion of the exemplified formulations in water can be accomplished with a minimum of effort. These properties are matters of convenience which are very desirable but not essential. Other modifications will occur to those who are skilled in the art.

What is claimed is:

1. In the chemical method of controlling wild oats with a compound of the structural formula

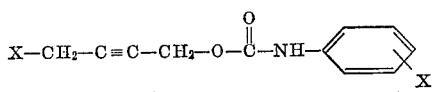

in which X is halo, the improvement which consists of employing a herbicidally effective amount of a combination of said compound with at least one molar equivalent of a quaternary ammonium salt in which the cation has a molecular weight within the range of about 200 to 400 and a structural formula selected from the group consisting of

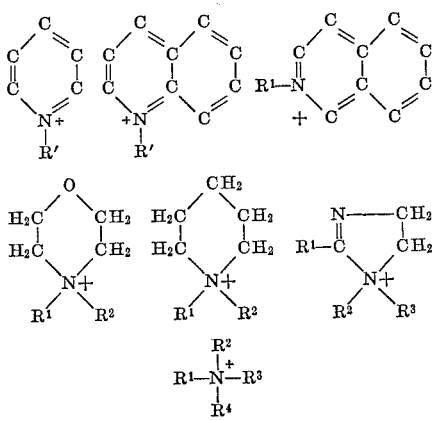

and

in which $R^1$ is a substituent containing from 7 to 21 carbon atoms selected from the group consisting of linear N-(dodecycloxyethyl)carbamoyloxymethyl, alkyl, and alkenyl, halobenzyl and alkylbenzl; $R^2$ is a substituent containing no more than 7 carbon atoms, selected from the group consisting of benzyl, alkyl, alkenyl, and hydroxyalkyl and $R^3$ and $R^4$ are selected from the group consisting of methyl, ethyl and hydroxyethyl.

2. The improvement according to claim 1 in which the cation of the quaternary ammonium salt has the structural formula:

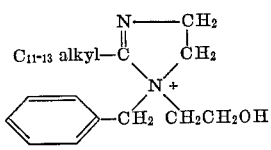

3. The improvement according to claim 1 in which the cation of the quaternary ammonium salt has the structural formula:

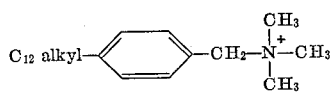

4. The improvement of claim 1 employing a herbicidal composition consisting of the equimolar adduct of 4-chlorobutynyl N-(3-chlorophenyl)carbamate and alkyl dimethyl benzyl ammonium chloride, said alkyl groups being principally dodecyl and tetradecyl, said adduct having a melting point between about 71 and 74.5° C.

5. The improvement of claim 1 employing a herbicidal composition in the form of a water dispersible concentrate consisting essentially of a solution of 4-chloro-2-butynyl N-(3-chlorophenyl)carbamate and approximately 1.5 molar equivalent of 2-alkyl-1-benzyl-1-(2-hydroxyethyl)-2-imidazolinium chloride.

6. The improvement of claim 1 employing a herbicidal composition in the form of a water dispersible concentrate consisting essentially of a solution of 4-chloro-2-butynyl N-(3-chlorophenyl)carbamate and approximately 1.75 molar equivalents of dodecylbenzyl trimethyl ammonium chloride.

7. The improvement according to claim 1 in which the cation of the quaternary ammonium salt has the structural formula:

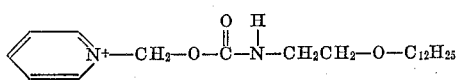

8. The improvement according to claim 1 in which the cation of the quaternary ammonium salt has the structural formula:

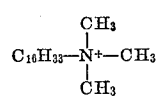

9. The improvement according to claim 1 in which the cation of the quaternary ammonium salt has the structural formula:

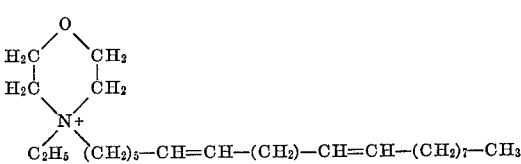

10. The improvement according to claim 1 in which the cation of the quaternary ammonium salt has the structural formula:

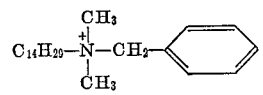

11. The improvement according to claim 1 in which the cation of the quaternary ammonium salt has the structural formula:

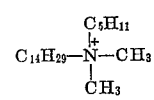

12. The improvement according to claim 1 in which the cation of the quaternary ammonium salt has the structural formula:

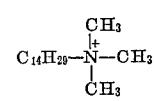

13. The improvement according to claim 1 in which the cation of the quaternary ammonium salt has the structural formula:

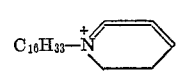

14. The improvement according to claim 1 in which the cation of the quaternary ammonium salt has the structural formula:

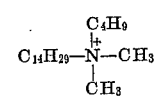

15. The improvement according to claim 1 in which the cation of the quaternary ammonium salt has the structural formula:

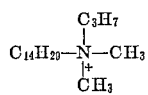

16. The improvement according to claim 1 in which the cation of the quaternary ammonium salt has the structural formula:

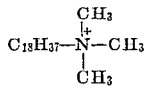

17. The improvement according to claim 1 in which the cation of the quaternary ammonium salt has the structural formula:

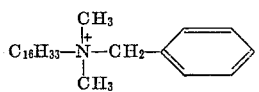

References Cited

UNITED STATES PATENTS

| | | | |
|---|---|---|---|
| 2,494,941 | 1/1950 | Goll | 167—30 |
| 2,689,789 | 9/1954 | Mowry et al. | 71—121 |
| 2,772,310 | 11/1956 | Morris | 71—79 |
| 2,906,614 | 9/1959 | Hopkins et al. | 71—111 |
| 2,970,048 | 1/1961 | Hamm et al. | 71—122 |
| 3,123,463 | 3/1964 | Hopkins et al. | 71—111 |
| 3,223,517 | 12/1965 | Abramitis et al. | 71—113 |

FOREIGN PATENTS 219,226  11/1957  Australia.

OTHER REFERENCES

McCutcheon: Detergents and Emulsifiers (1963), pp. 20 and 28.

LEWIS GOTTS, *Primary Examiner.*

G. HOLLRAH, *Assistant Examiner.*

U.S. Cl. X.R.

71—92, 94, 111, 121